US010904024B2

(12) United States Patent
Skiff et al.

(10) Patent No.: US 10,904,024 B2
(45) Date of Patent: *Jan. 26, 2021

(54) SYSTEMS AND METHODS FOR PROVIDING CATEGORY-SENSITIVE CHAT CHANNELS

(71) Applicant: Palantir Technologies Inc., Palo Alto, CA (US)

(72) Inventors: David Skiff, Redwood City, CA (US); Peter Wilczynski, San Francisco, CA (US); Timothy Yousaf, New York, NY (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/276,019

(22) Filed: Feb. 14, 2019

(65) Prior Publication Data

US 2019/0182062 A1 Jun. 13, 2019

Related U.S. Application Data

(63) Continuation of application No. 15/826,441, filed on Nov. 29, 2017, now Pat. No. 10,250,401.

(51) Int. Cl.
*G06F 15/16* (2006.01)
*H04L 12/18* (2006.01)
(Continued)

(52) U.S. Cl.
CPC ...... *H04L 12/1818* (2013.01); *H04L 12/1859* (2013.01); *H04L 51/04* (2013.01);
(Continued)

(58) Field of Classification Search
None
See application file for complete search history.

(56) References Cited

U.S. PATENT DOCUMENTS 8,112,487 B2 * 2/2012 Leedberg ............... H04L 51/12
 379/100.08
9,116,917 B1 8/2015 Ekwall et al.
(Continued)

FOREIGN PATENT DOCUMENTS

EP 3410314 12/2018
WO WO 2009/034406 3/2009

OTHER PUBLICATIONS

Bertino et al: "Access Control Systems for Geospatial Data and Applications" In: "Spatial Data on the Web", Jan. 1, 2007, Springer Berlin Heidelberg, Berlin, Heidelberg; ISBN: 978-3-540-69877-7 pp. 189-214.
Broberg et al. "The Anatomy and Facets of Dynamic Policies" 2015 IEEE 28th Computer Security Foundations Symposium, IEEE, Jul. 13, 2015, pp. 122-136, [retrieved on Sep. 4, 2015].
Lin et al.: "Analysis of Access Control Mechanisms for Spacial Database", Jan. 1, 2008, XP055514572, Retrieved from the Internet: URL: http://citeseerx.ist.psu.edu/viewdoc/download?doi=10.1.1.184.3608&rep=rep1&type=pdf; [retrieved on Oct. 11, 2018].
(Continued)

*Primary Examiner* — Phuoc H Nguyen
(74) *Attorney, Agent, or Firm* — Sheppard Mullin Richter & Hampton LLP

(57) ABSTRACT

Systems, methods, and non-transitory computer readable media are provided for providing category-sensitive chat channels. A category-sensitive chat channel may be provided. The category-sensitive chat channel may be assigned a given category level. The given category level may determine a scope of content allowed in the category-sensitive chat channel. Information to be posted through the category-sensitive chat channel may be obtained. The obtained information may be filtered based on the given category level. The filtered information may be posted in the category-sensitive chat channel.

20 Claims, 5 Drawing Sheets

(51) Int. Cl.
*H04L 29/06* (2006.01)
*H04L 12/58* (2006.01)

(52) U.S. Cl.
CPC ........ *H04L 63/0245* (2013.01); *H04L 63/105* (2013.01); *H04L 51/16* (2013.01)

(56) References Cited

U.S. PATENT DOCUMENTS

| | | | |
|---|---|---|---|
| 9,185,147 | B1 | 11/2015 | Keel |
| 9,712,466 | B2 | 7/2017 | Cohen et al. |
| 9,882,851 | B2 * | 1/2018 | Gunasekara ............. H04L 51/12 |
| 2006/0031340 | A1 * | 2/2006 | Mathew ............... G06Q 10/107 709/206 |
| 2008/0244017 | A1 * | 10/2008 | Gershinsky ......... H04L 63/0227 709/206 |
| 2009/0125595 | A1 * | 5/2009 | Maes ..................... H04L 51/12 709/206 |
| 2012/0240062 | A1 * | 9/2012 | Passmore ................ H04L 51/32 715/758 |
| 2015/0149489 | A1 * | 5/2015 | Hariharan ............. G06F 3/0481 707/754 |
| 2015/0186494 | A1 * | 7/2015 | Gilad ...................... H04L 51/22 707/740 |
| 2018/0287976 | A1 * | 10/2018 | Hochstein ............... H04L 51/10 |
| 2018/0351898 | A1 * | 12/2018 | Lindeman ............... H04L 51/12 |

OTHER PUBLICATIONS

Official Communication for European Patent Application No. 18173064.9 dated Aug. 13, 2018.
Official Communication for European Patent Application No. 18173063.1 dated Oct. 23, 2018.
Official Communication for European Patent Application No. 18209228.8 dated Jan. 22, 2019.
Official Communication for U.S. Appl. No. 15/709,074 dated Dec. 14, 2017.
Official Communication for U.S. Appl. No. 15/653,307 dated Oct. 5, 2018.
Official Communication for U.S. Appl. No. 15/709,074 dated May 4, 2018.
Official Communication for U.S. Appl. No. 15/709,074 dated Nov. 29, 2018.
Official Communication for U.S. Appl. No. 15/826,441 dated Feb. 27, 2018.
Official Communication for U.S. Appl. No. 15/940,744 dated Jun. 29, 2018.
Communication for EP Appln. No. 18209228.8 dated Oct. 9, 2020, 4 pages.
Gehres et al., "Toward Sensitive Information Redaction in a Collaborative, Multilevel Security Environment", Proceedings of the Sixth International Symposium on Wikis and Open Collaboration, Gdansk, Poland, Jul. 7, 2010, 4 pages.

* cited by examiner

SYSTEMS AND METHODS FOR PROVIDING CATEGORY-SENSITIVE CHAT CHANNELS

CROSS REFERENCE TO RELATED APPLICATIONS

This application is a continuation of U.S. Ser. No. 15/826,441, filed on Nov. 29, 2017, the content of which is incorporated by reference in its entirety into the present disclosure.

FIELD OF THE INVENTION

This disclosure relates to approaches for providing category-sensitive chat channels.

BACKGROUND

Under conventional approaches, people may wish to use an electronic space to share messages, documents, objects, and/or other information. Sensitivity of information to be shared may require restricting access to such information to various authorized users or groups of users.

SUMMARY

Various embodiments of the present disclosure may include systems, methods, and non-transitory computer readable media configured to provide category-sensitive chat channels. Various embodiments of the present disclosure may include systems, methods, and non-transitory computer readable media configured to provide a category-sensitive chat channel. The category-sensitive chat channel may be assigned a given category level. The given category level may determine a scope of content allowed in the category-sensitive chat channel. Information to be posted through the category-sensitive chat channel may be obtained. The obtained information may be filtered based on the given category level. The filtered information may be posted in the category-sensitive chat channel.

In some embodiments, the given category level may be a security classification level or a sensitivity classification level. Information posted in the category-sensitive chat channel may be assigned the given category level.

In some embodiments, the given category level may be a level within a hierarchy of category levels and filtering the obtained information based on the given category level may include filtering out information above the given category level.

In some embodiments, the category-sensitive chat channel may be part of threaded category-sensitive chat channels. The threaded category-sensitive chat channels may include a first category-sensitive chat channel assigned a first category level and a second category-sensitive chat channel assigned a second category level. The second category level may be higher than the first category level such that information posted in the first category-sensitive chat channel is visible in the second category-sensitive chat channel.

In some embodiments, a preview of the filtered information may be provided prior to posting the filtered information in the category-sensitive chat channel.

In some embodiments, the category-sensitive chat channel may have one or more administrative users and one or more participating users.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
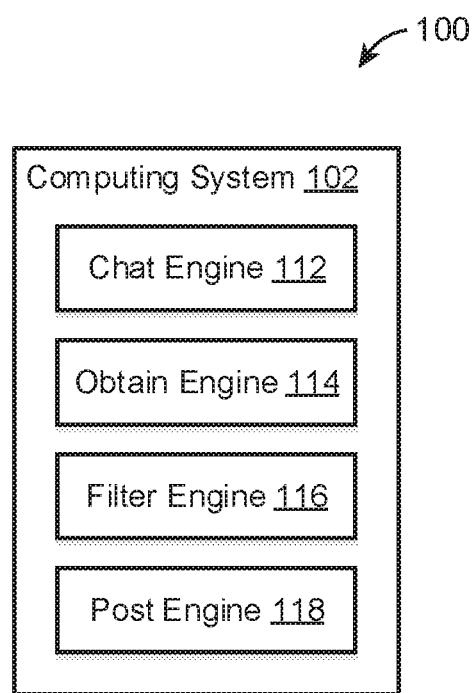
FIG. 1 illustrates an example environment for providing category-sensitive chat channels, in accordance with various embodiments.

A claimed solution rooted in computer technology overcomes problems specifically arising in the realm of computer technology. In various implementations, a computing system (e.g., server) may provide access to one or more category-sensitive chat channels. A category-sensitive chat software application may be used (e.g., by one or more computing/client devices) to access a number of different category-sensitive chat channels through the computing system. In some instances, one or more category-sensitive chat channels may be assigned a given category level (e.g., security classification level, sensitivity classification level) that may be used to determine the scope of content that may be posted in, or shared through, the category-sensitive chat channel(s). The given category level may be displayed/indicated in the category-sensitive chat channel. For example, a channel identifier may be identified in a graphical user interface through which the category-sensitive chat channel is being accessed. In this example, the interface may include a banner in which channel information (including the given category level of the channel) is displayed.

In various embodiments, content (or information) being posted in, or shared through, the category-sensitive chat channel may be filtered based at least in part on the category level associated with the category-sensitive chat channel. In various embodiments, content that satisfies the category level associated with the category-sensitive chat channel may be shared through the category-sensitive chat channel while any content that fails to satisfy the category level may be prevented from being shared through the category-sensitive chat channel. In some embodiments, the given category level may be a level within a hierarchy of category levels. In such embodiments, filtering content based on the given category level may include filtering out content above the given category level (e.g., filtering out content that is of higher security/sensitivity classification level than the category level associated with the category-sensitive chat channel). In some embodiments, content posted in the category-sensitive chat channel may automatically be assigned (or re-assigned) the category level associated with the category-sensitive chat channel.

Users may use the category-sensitive chat channel to restrict posting of information above the given category level and to prevent unauthorized sharing of classified/sensitive information. In various embodiments, the category-sensitive chat channel may allow users to freely share information without being concerned about other users' access privileges since the category-sensitive chat channel's corresponding category level is used to automatically filter content based on the content's respective security/sensitivity classification level.

The category sensitive chat channel may be part of threaded category sensitive chat channels. The threaded category-sensitive chat channels may include multiple category-sensitive chat channels, with individual category-sensitive chat channels being assigned different category levels. For example, the threaded category-sensitive chat channels may include a first category-sensitive chat channel assigned a first category level and a second category-sensitive chat channel assigned a second category level higher than the first category level. Such threading of category-sensitive chat channels may allow for different views of information posted to the category-sensitive chat channels. In the foregoing example, any content posted in the first category-sensitive chat channel would be visible in the second category-sensitive chat channel while certain content (e.g., content that is assigned the second category level) posted in the second category-sensitive chat channel would not be visible in the first category-sensitive chat channel.

The computing system may provide a preview of the filtered information (content) prior to posting the filtered information in the category-sensitive chat channel. A preview of the filtered information may redact/mark/highlight certain pieces of information to be filtered. A preview of the filtered information may be used as a final confirmation before the information is posted. In some embodiments, a user may be asked to provide input as part of the final confirmation. In such embodiments, the user may decide to prevent sharing of certain information based on redaction/marking/highlighting in the preview or the user may confirm the classification of the content being shared/confirm posting of the filtered information.

The category-sensitive chat channel may have one or more administrative users (e.g., chat owners) and one or more participating users (e.g., chat members). Administrative users may invite one or more users to become administrative users or participating users. Administrative users may change a participating user into an administrative user. Administrative users may change the given category level of the category-sensitive chat channel. For example, the given category level may be raised and users without sufficient access privileges may be removed from the category-sensitive chat channel. Administrative users may create new category-sensitive chat channels. For example, a new category-sensitive chat channel with a different category level may be added to threaded category sensitive chat channels so that users may view information posted to the chat using different category levels. A category-sensitive chat channel may be configured as an open chat (e.g., users may join the chat channel by finding the chat using a search) or a closed chat (e.g., users may join the chat channel only by invitation).

The approaches disclosed herein enable the use of classification-aware (e.g., security-aware, sensitivity-aware) chats/channels that automatically prevent users from sharing information with others who are not authorized to see the information. Such filtering of information enables users to share information without having knowledge of other users' access privileges. The approaches disclosed herein provide for enforcement of a given category level on the information posted in the chats/channels by restricting the scope of content posted in the chats/channels. The approaches disclosed herein enable users to share information at a given category level. For example, a user may wish to share information at a lower category level than the user has access (e.g., to see the type of information available to other users with different access to information). The approaches disclosed herein provide a tool by which users may check on the classification of information to be shared. For example, a preview of information to be posted in the chat/channel may indicate different classification levels within the information. As another example, a user may be invited to join a chat/channel of a given category level. The user may not have received proper authorization to access information assigned the given category level and may be prohibited from accessing the chat/channel. Based on the user's inability to access the chat/channel, the user may be instructed to obtained the proper authorization.

FIG. 1 illustrates an example environment 100 for providing category-sensitive chat channels, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a chat engine 112, an obtain engine 114, a filter engine 116, a post engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or multiple computing devices.

In various embodiments, the chat engine 112 is configured to provide one or more category-sensitive chat channels. A chat (or chat session) may refer to a type of communication over the network that provides real-time/close to real-time transmission of messages between users of the chat. Messages may include visual information (e.g., text, icon, symbol, image, video, graph), audio information (e.g., audio, sound clips), and/or other information. Messages may include one or more topics/subjects. For example, a message posted using a chat may include information about/relating to a person/thing, a location, a map, a graph, a media item (e.g., picture, sound clip, presentation, video), and/or other text/data objects.

A chat channel may refer to a particular portion of a chat. For example, a chat may be formed to discuss one or more topics (such as a particular person, object, artifact, and/or search) and the chat may include (or be associated with) one or more channels to view particular aspects/types of information posted within the chat. As another example, a chat may be formed to discuss a general topic and the chat may include (or be associated with) one or more channels that each correspond to a specific topic/sub-topic of the general topic. In some embodiments, a chat may include a single channel.

A category-sensitive chat channel may refer to a channel that is assigned a given category-level. The given category level may determine the scope of content allowed in the category-sensitive chat channel. The given category level may be a security classification level or a sensitivity classification level. Other types of category/classification levels are contemplated. The given category level may be used to determine the scope of content/information that may be posted in, or shared through, the category-sensitive chat channel. For example, the given category level may be used to determine whether certain visual/audio/other information to be posted to the category-sensitive chat channel should be filtered (e.g., redacted) prior to posting or should be rejected from being posted.

The given category level of a category-sensitive chat channel may be displayed/indicated in the category-sensitive chat channel. For example, a channel identifier (e.g., channel name) may be identified in a graphical user interface through which the category-sensitive chat channel is being accessed. In this example, the user interface may include a banner in which channel information (including the given category level of the channel) is displayed. Such presentation of the given category level may provide a reminder to the user(s) of the category-sensitive chat channel as to the scope of content to be shared within the category-sensitive chat channel.

In some embodiments, a given category level of a category-sensitive chat channel may be a level within a hierarchy of category levels. A hierarchy of category levels may include multiple levels of category levels with different category levels that are ordered/ranked such that a higher category level includes a lower category level. A higher category level may refer to a category level with more strict security/sensitivity classification than a lower category level. For example, a "Top Secret" level may be treated as a higher category level than a "Secret" level. Further, a "Highly Confidential" level may be a higher category level than a "Confidential" level. Other hierarchy of category levels are contemplated.

In some embodiments, a category-sensitive chat channel may be part of threaded category-sensitive chat channels. Threaded category-sensitive chat channels may include multiple category-sensitive chat channels, with individual category-sensitive chat channels being assigned different category levels. Threaded category-sensitive chat channels may include one or more channels that are nested with another channel. For example, threaded category-sensitive chat channels may include a first category-sensitive chat channel assigned a first category level and a second category-sensitive chat channel assigned a second category level. The second category level may be higher than the first category level. The first category-sensitive chat channel may be nested within the second category-sensitive chat channel. Such threading of category-sensitive chat channels may allow for different views of information posted to the category-sensitive chat channels. For instance, in the foregoing example, any content posted in the first category-sensitive chat channel may be visible in the second category-sensitive chat channel while certain content (e.g., content that is assigned the second category level) posted in the second category-sensitive chat channel may not be visible in the first category-sensitive chat channel.

The chat engine 112 may provide the category-sensitive chat channel(s) for access by one or more users. For example, the computing system 102 may include a server and the category-sensitive chat channel(s) may be provided for access by one or more users of the computing system 102 and/or one or more users of computing/client device(s) (e.g., desktop device, mobile device) communicating with the computing system 102. A category-sensitive chat software application (e.g., desktop application/plugin, web browser application/plugin) may be used (by the computing system 102 and/or one or more computing/client devices) to access one or more category-sensitive chat channels provided by the computing system 102.

Interfaces (e.g., user interfaces of a category-sensitive chat software application) for chats/channels may provide information regarding the chats/channels. For example, a user interface for a chat/channel may provide information relating to the user, identity of other users/teams of users within the chat/channel, one or more projects to which the topic/chat/channel relates (e.g., identification of an investigation for which the topic is of interest), and/or other information. The user interface for a chat/channel may enable a user to search for particular information within the chat/channel, filter the information posted within the chat/channel (e.g., based on a post being pinned, mentioning an object/map/graph, etc.). The user interface for a chat/channel may provide alerts relating to new messages (e.g., number of messages not yet read by a user) and/or provide information relating to the number/identities of users who have viewed/interacted with a particular message/feed. The user interface for a chat/channel may enable a user to customize views of one or more chats/channels, such as by adding one or more feeds (e.g., object feeds, map feeds, graph feeds, document feeds, search feeds) to the user interface. In some embodiments, one or more chats/channels may allow for one-way peering. For example, a single chat may include two separate channels on different networks, with one of the channels having a view of the information posted in the other channel.

In some embodiments, different interfaces may be provided for chats/channels of different topics. For example, a person-centric chat/channel may provide for a shared space within which to post information about one or more persons. The user interface for the person-centric chat/channel may be organized to highlight information about the one or more persons. As another example, an object-centric chat/channel may provide for a shared space within which to post information about one or more objects. The user interface for the object-centric chat/channel may be organized to highlight information about the one or more objects. Other functionalities for the user interface and types of user interfaces for other topics (e.g., artifact-centric chat/channel, search-centric chat/channel) are contemplated.

The computing/client devices may communicate with the computing system 102 using one or more protocols (communication protocol, security protocol, authorization/authentication protocol). Based on a user's credentials, the chat engine 112 may provide access to different category-sensitive chat channels to the user's computing/client device. For example, the user's credentials may be used to determine to which chats/channels the user has authorization. Based on the user's credentials, the chat engine 112 may provide to the user's computing/client device access to particular chat(s)/channel(s). For example, the chat engine 112 may provide access to the category-sensitive chat channels that fall within the security/sensitivity classification level of the user as determined based on the user's credentials and/or other information.

In some embodiments, a category-sensitive chat channel may be configured as an open chat or a closed chat. An open chat channel may refer to a channel that may be accessible to users regardless of their membership in the channel. An open chat channel may be joined by a user based on the user searching for the channel, finding the channel, and requesting access/membership. For example, a user that has logged into the computing system 102 may be allowed to search for open category-sensitive chat channels based on name of the channel, topic of the channel, users of the channel, properties of the channel, and/or other information.

A closed channel may refer to a channel that may not be listed in search results and/or may only allow new users to join via an invite. Closed category-sensitive chat channels may be restricted from appearing within search results for chat channels. For example, closed category-sensitive chat channels may not appear as a search result for chat channel even though its name/topic/users/properties match the search criteria. In some embodiments, closed category-sensitive chat channels may appear in searches conducted by existing users (e.g., owners, members) of the closed category-sensitive chat channels.

In some embodiments, a category-sensitive chat channel may have one or more administrative users (e.g., chat owners) and one or more participating users (e.g., chat members). A participating user may refer to a user whose access to the category-sensitive chat channel includes accessing (or viewing) content/information posted in the category-sensitive chat channel. A participating user's access to the category-sensitive chat channel may include permissions for posting content/information in the category-sensitive chat channel. In some embodiments, a participating user's access to the category-sensitive chat channel may include permissions for modifying information posted in the category-sensitive chat channel. For example, a participating user may modify the user's own posts (e.g., edit text included in the user's message posted in the channel) and/or modify other users' posts (e.g., modify an object inserted in the channel by another user, enabling collaboration between multiple users).

An administrative user may refer to a user whose access to the category-sensitive chat channel includes permissions for managing the category-sensitive chat channel. For example, an administrative user may be able to perform one or more of changing a membership of the channel (e.g., adding/removing a participating user, adding/removing an administrative user), changing category level of the channel, adding/removing/changing a channel, controlling one or more visual aspects of the channel (e.g., setting/changing feed criteria), and/or other management of the category-sensitive chat channel. For example, an administrative user may invite one or more users as administrative users or participating users. An administrative user may change a participating user into an administrative user. An administrative user may change the given category level of the category-sensitive chat channel. For example, the given category level may be raised and existing users without sufficient access privileges may be removed from the category-sensitive chat channel. As another example, a new threaded category-sensitive chat channel with a different category level may be added to threaded category sensitive chat channels so that users may view information posted to the chat using different category levels. Such may allow for the continued use of the exiting channel(s) and a new view of posted information using the newly created channel.

In various embodiments, the obtain engine 114 is configured to obtain information to be posted through a category-sensitive chat channel. The information to be posted through the category-sensitive chat channel may be obtained directly at the computing system 102 (e.g., received from a user using the computing system 102) or received from another computing device (e.g., received from a user using a computing/client device that communicates with the computing system 102). For example, a user may use a computing/client device that runs a category-sensitive chat software application. In this example, the software application may be used by the user to provide information (e.g., text, images, videos, audio, object data, etc.) to be posted through the category-sensitive chat channel. The information provided by the user may be obtained by the obtain engine 114, for example, over a network. The information provided by the user may be obtained by the obtain engine 114 in a single communication or over multiple communications.

The information provided by the user may include structured data, which may include information/tags on the secure/sensitive nature of the information/portion(s) of the information. Such security/sensitivity information/tags may be used to determine how the provided information should be posted in the category-sensitive chat channel. For example, the information provided by the user may include data (e.g., graphs, maps, documents, objects) with redactable portions. The redactable portions may be associated/tagged with particular security/sensitivity classification. The redactable portions may be filtered based on the classification of the redactable portions and the category level of the category-sensitive chat channel in which the information is to be posted.

In various embodiments, the filter engine 116 is configured to filter the obtained information based on the given category level of the category-sensitive chat channel and/or other information. The filter engine 116 may redact and/or mark for redaction one or more portions of the obtained information (content to be posted) based at least in part on the given category level associated with the category-sensitive chat channel in which the obtained information is to be posted. For example, the filter engine 116 may remove/mark as to be removed the portion(s) of the obtained information (content) that fails to satisfy the given category level (preventing such content from being shared through the category-sensitive chat channel) while leaving intact the portion(s) of the obtained information that satisfy the given category level (allowing such content to be shared through the category-sensitive chat channel).

For example, the given category level may be a level within a hierarchy of category levels and the filter engine 116 may filter portions of the obtained information that are classified above the given category level (e.g., filtering out content is that of higher security/sensitivity classification level than the category level associated with the category-sensitive chat channel). As another example, the category-sensitive chat channel may be part of threaded category-sensitive chat channels, and the filter engine 116 may filter the obtained information differently based on the different category levels of the threaded category-sensitive chat channels (e.g., filtering out certain portion of the content before sharing within one threaded category-sensitive chat channel while leaving the certain portion of the content for sharing within another threaded category-sensitive chat channel).

In various embodiments, the post engine 118 is configured to post the filtered information in the category-sensitive chat channel. That is, the post engine 118 may post the obtained content after the content has been redacted for viewing/sharing based on the given category level of the category-sensitive chat channel. In some embodiments, content posted in the category-sensitive chat channel may automatically be assigned (or re-assigned) the category level associated with the category-sensitive chat channel. For example, content posted in the category-sensitive chat channel assigned a "Top Secret" classification may be assigned/re-assigned the Top Secret classification. Such assignment of the given category level may prevent unauthorized sharing of information posted in the category-sensitive chat channel. For example, information posted in the Top Secret category-sensitive chat channel may not be shared in a "Secret" category-sensitive chat channel (e.g., a user is not allowed to copy and paste a message from a Top Secret category-sensitive chat to a Secret category-sensitive chat channel).

In some embodiments, the post engine 118 may be configured to provide a preview of the filtered information prior to posting the filtered information in the category-sensitive chat channel. A preview of the filtered information may redact/mark/highlight certain pieces of information to be filtered. A preview of the filtered information may provide a view of how the obtained information may look once posted in the category-sensitive chat channel. For example, a user may provide a data object for posting in the category-sensitive chat channel and the post engine 118 may provide a redacted version of the data object for viewing by the user before the redacted version of the data object is posted in the category-sensitive chat channel. As another example, the post engine 118 may mark (e.g., highlight) one or more portions of the data object to indicate the classification of the portion(s). A preview of the filtered information may be used as a confirmation before the information is posted. A preview of the filtered information may be used as a check on the classification of the information. For example, the preview may alert a user that a classification in the information to be posted may be incorrect or alert a user that the information to be shared falls outside the given category level of the category-sensitive chat channel.

In some embodiments, a user may be asked to provide input as part of a confirmation (e.g., clicking a button, entering one or more keys to confirm the posting) before information is posted in a category-sensitive chat channel. In such embodiments, the user may decide to prevent sharing of certain information in the category-sensitive chat channel based on redaction/marking/highlighting in the preview or the user may confirm the classification of the content being shared/confirm posting of the filtered information.

Figure 2A:
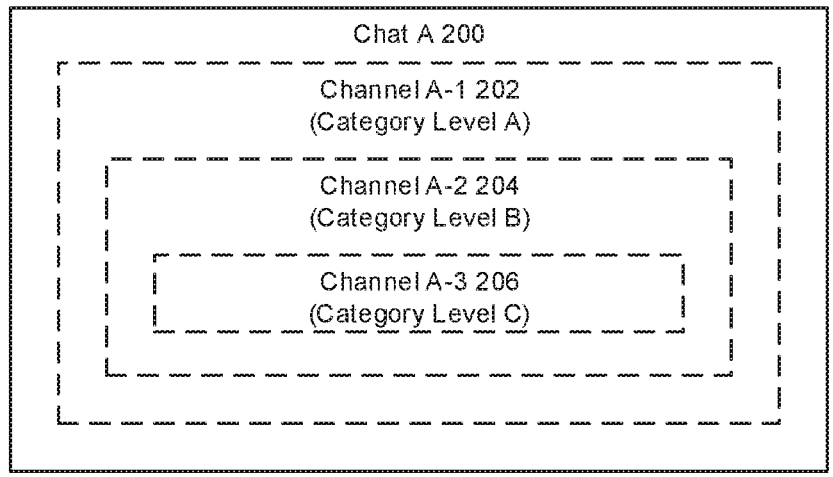
FIG. 2A illustrates example chat channels and category levels, in accordance with various embodiments.

FIG. 2A illustrates an example chat A 200, in accordance with various embodiments. The chat A 200 may include three chat channels: a channel A-1 202, a channel A-2 204, and a channel A-3 206. The channel A-1 202 may be assigned a category level A. The channel A-2 204 may be assigned a category level B. The channel A-3 206 may be assigned a category level C. The category levels A, B, and C may determine the scope of content allowed in the channels 202, 204, 206, respectively. The category levels A, B, and C may be levels within a hierarchy of category levels. The category levels A, B, and C may be ordered/ranked such that category level A is higher than both category level B and category level C, and category level B is higher than category level C, for example.

The channels 202, 204, 206 may be part of threaded category-sensitive chat channels. The threaded category-sensitive chat channels may include the channel A-3 206 nested within the channel A-2 204, and the channel A-2 204 nested within the channel A-1 202. Based on the hierarchy of category levels A, B, and C, any content posted in the channel A-3 206 may be visible within the channel A-2 204 and the channel A-1 202. Further, any content posted in the channel A-2 204 may be visible within the channel A-1 202 but not within the channel A-3 206. In some embodiments, certain content (e.g., content that is classified as the category level B) posted in the channel A-2 204 is not visible in the channel A-3 206. Further, in such embodiments, certain content (e.g., content that is classified as the category level A) posted in the channel A-1 202 is not visible in the channel A-2 204 or channel A-3 206. Other threaded category-sensitive channels and other category levels are contemplated.

Figure 2B:
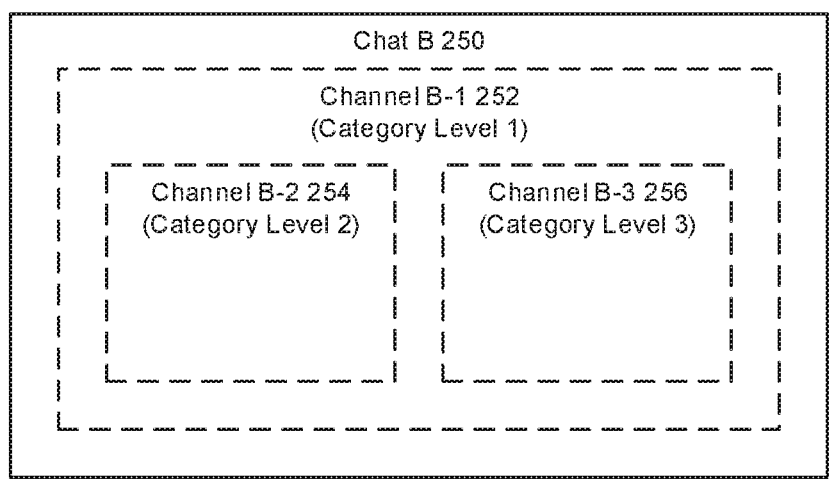
FIG. 2B illustrates example chat channels and category levels, in accordance with various embodiments.

FIG. 2B illustrates an example chat B 250, in accordance with various embodiments. The chat B 250 may include three chat channels: a channel B-1 252, a channel B-2 254, and a channel B-3 256. The channel B-1 252 may be assigned a category level 1. The channel B-2 254 may be assigned a category level 2. The channel B-3 256 may be assigned a category level 3. The category levels 1, 2, and 3 may determine the scope of content allowed in the channels 252, 254, 256, respectively. The category levels 1, 2, and 3 may be levels within a hierarchy of category levels. The category levels 1, 2, and 3 may be ordered/ranked such that the category level 1 is higher than both the category level 2 and the category level 3. The category levels 2 and 3 may not include any overlaps. That is, information within the category level 2 may not fall within the category level 3, and vice versa. In some embodiments, the category levels 2 and 3 may include one or more overlaps. That is, some information may fall within both category level 2 and category level 3.

The channels 252, 254, 256 may be part of threaded category-sensitive chat channels. The threaded category-sensitive chat channels may include the channel B-2 254 and the channel B-3 256 nested within the channel B-1 252. Based on the hierarchy of category levels 1, 2, and 3, in this example, any content posted in the channel B-2 254 or the channel B-3 256 is visible within the channel B-1 252. Further, in this example, certain content posted in the channel B-1 252 is not visible in the channel B-2 254. Similarly, certain content posted in the channel B-1 252 is not visible in the channel B-3 256. Content posted in the channel B-2 254 is not visible in the channel B-3 256. Also, in this example, content posted in the channel B-3 256 is not visible in the channel B-2 254. Other threaded category-sensitive channels and other category levels are contemplated.

Figure 3:
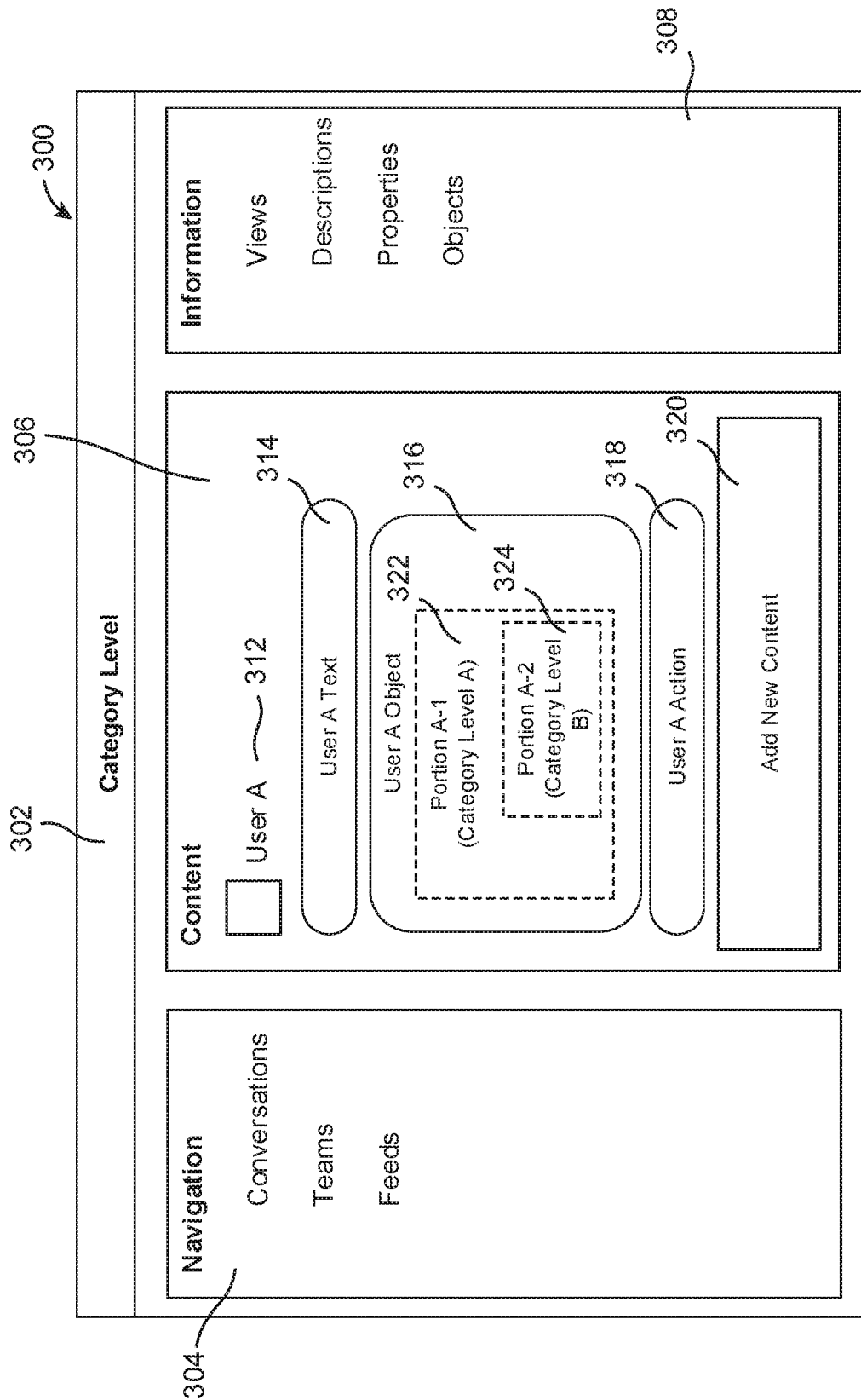
FIG. 3 illustrates an example interface for using a category-sensitive chat channel, in accordance with various embodiments.

FIG. 3 illustrates an example user interface 300 for using a category-sensitive chat channel, in accordance with various embodiments. In various embodiments, the user interface 300 may be accessed through a software application running on a computing device (e.g., computers, mobile phones, tablets, etc.) that includes one or more processors and memory. For example, the user interface 300 may be accessible through a web browser. In another example, the user interface 300 may be provided through a chat software application. In yet another example, the user interface 300 may be provided as a service over a network (e.g., software as a service). Depending on the computing device, the user may be able to interact with the user interface 300 using various input devices (e.g., keyboard, mouse, etc.) and/or touch gestures. The user interface 300 is provided merely as an example and, naturally, the arrangement and configuration of such user interfaces may vary depending on the implementation. Thus, depending on the implementation, the user interface 300 may include additional features and/or alternative features.

The user interface 300 may include a banner region 302, a navigation region 304, a content region 306, an information region 308, and/or other regions. The banner region 302 may display identifying information relating to a chat/chat channel, such as a title/topic/subject of the chat/channel and/or an applicable category level of the chat/chat channel. The navigation region 304 may display information relating navigation of the chat/chat channel, such as number/identities of users using the chat/chat channel (Conversations), number/identities of users of teams using the chat/chat channel (Teams), one or more feeds (e.g., one way peering) into another chat/chat channel (Feeds), and/or other information.

The content region 306 may display content posted within a chat channel. The content posted within the chat channel may be filtered based on the category level of the chat channel. For example, the content region 306 may display content posted by a user A. The identity of the user that posted the content may be indicated by a visual indicator 312, which may include text referencing the user (e.g., user name/ID) and/or a visual identifier corresponding to the user (e.g., icon, picture). The user A may have provided for posting in the chat channel certain text, which may be filtered and/or displayed within the content region 306 as user A text 314. The user A may have provided for posting in the chat channel an object, which may be filtered and/or displayed within the content region 306 as user A object 316. The user A object 316 may include information with a portion A-1 322 classified as category level A and a portion A-2 324 classified as category level B. Based on the category level of the chat channel, the portion A-1 322 and/or the portion A-2 324 may be filtered (e.g., redacted) before the user A object 316 is posted in the chat channel. In some embodiments, a preview of the user A object 316 with relevant information redacted/highlighted may be presented to the user A prior to the user A object 316 being posted in the chat channel.

The user A may perform actions within the chat channel. For example, the user A may interact with the user A object 316 to add, remove, and/or modify a portion of the user A object 316 (e.g., the user A object 316 may be a map and the user A may have added/removed/modified an object's location on the map). The user's action within the chat channel may be described within the content region 306 (e.g., within user A action 318).

An add new content region 320 may enable a user to enter information to be posted in the chat channel. The add new content region 320 may enable a user to enter textual information, visual information, audio information, and/or other information. In some embodiments, the add new content region 320 may enable a user to mention/highlight/link objects, persons, maps, graphs, documents, and/or other features within a message via use of one or more symbols (e.g., use of @ before the identifier of the thing to be mentioned/highlighted/linked). In some embodiments, mentioning/highlighting/linking a feature within a message may prompt a view of the feature to be presented within the chat channel. Such may enable a user to insert an object through textual commands. The view of the feature may be filtered based on the category level of the chat channel. In some embodiments, a preview of the information to be posted in the chat channel may be provided within the add new content region 320. The user may be prompted to confirm the posting of the information (e.g., via interaction with a confirmation button) before the information is posted to the chat channel.

The information region 308 may display information relating to content posted within the chat channel. For example, the information region 308 may display views, description, properties, objects, and/or other information relating to a topic of the chat channel and/or a feature posted in the content region 306. For example, the topic of the chat channel/a feature posted in the content region 306 may relate to an entity and the information region 308 may display information relating to the entity (e.g., full name, address, phone number, identifiers, associated persons/objects, etc.). As another example, the topic of the chat channel/a feature posted in the content region 306 may relate to a location and the information region 308 may display information relating to the location (e.g., coordinates, locations of notable buildings/activities within the location, map of the location, identifiers/links to objects on the map, etc.). Presentation of other information within the information region 308 are contemplated.

Figure 4:
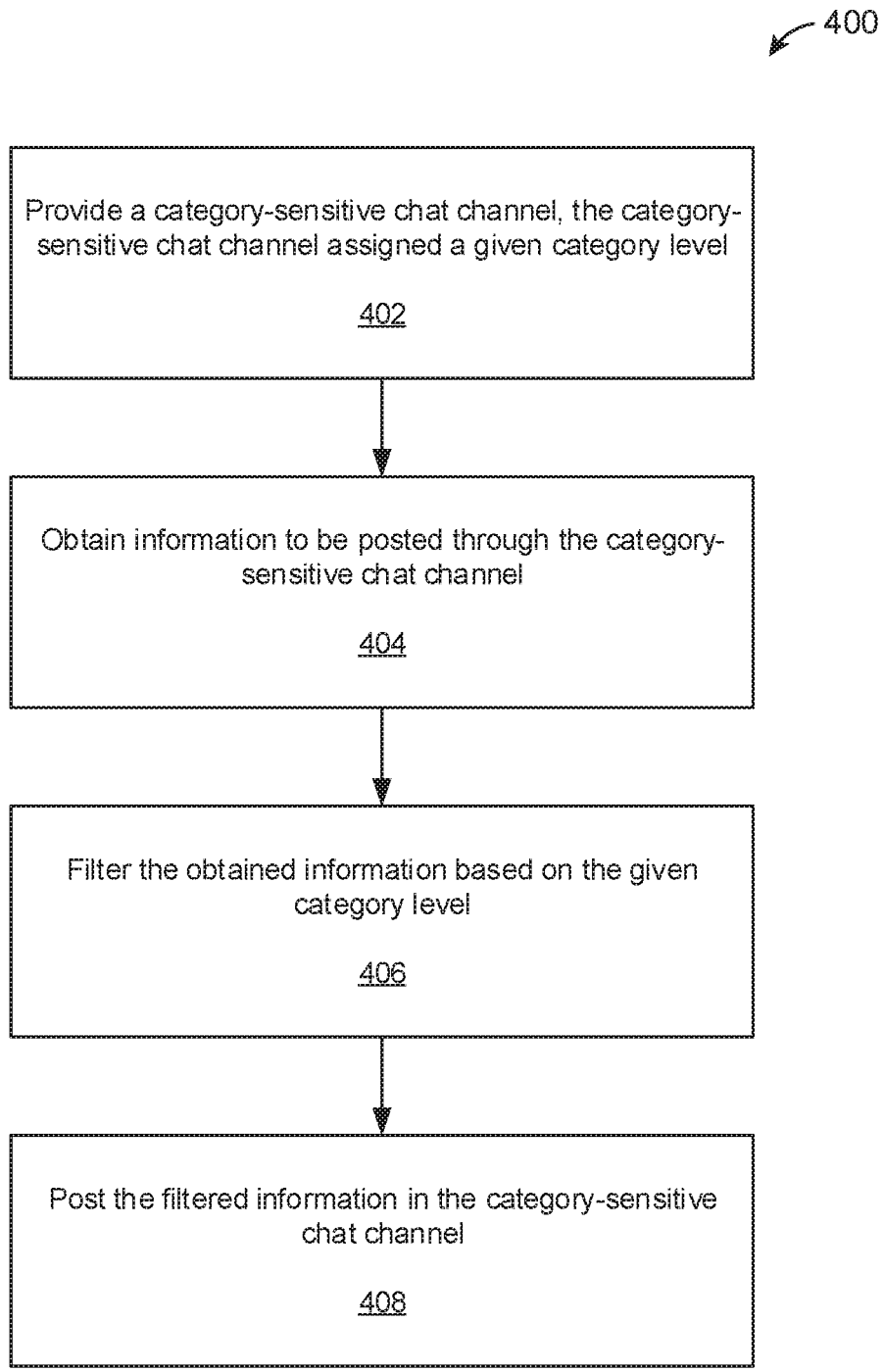
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a category-sensitive chat channel may be provided. The category-sensitive chat channel may be assigned a given category level. The given category level may determine a scope of content allowed in the category-sensitive chat channel. At block 404, information to be posted through the category-sensitive chat channel may be obtained. At block 406, the obtained information may be filtered based on the given category level. At block 408, the filtered information may be posted in the category-sensitive chat channel.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
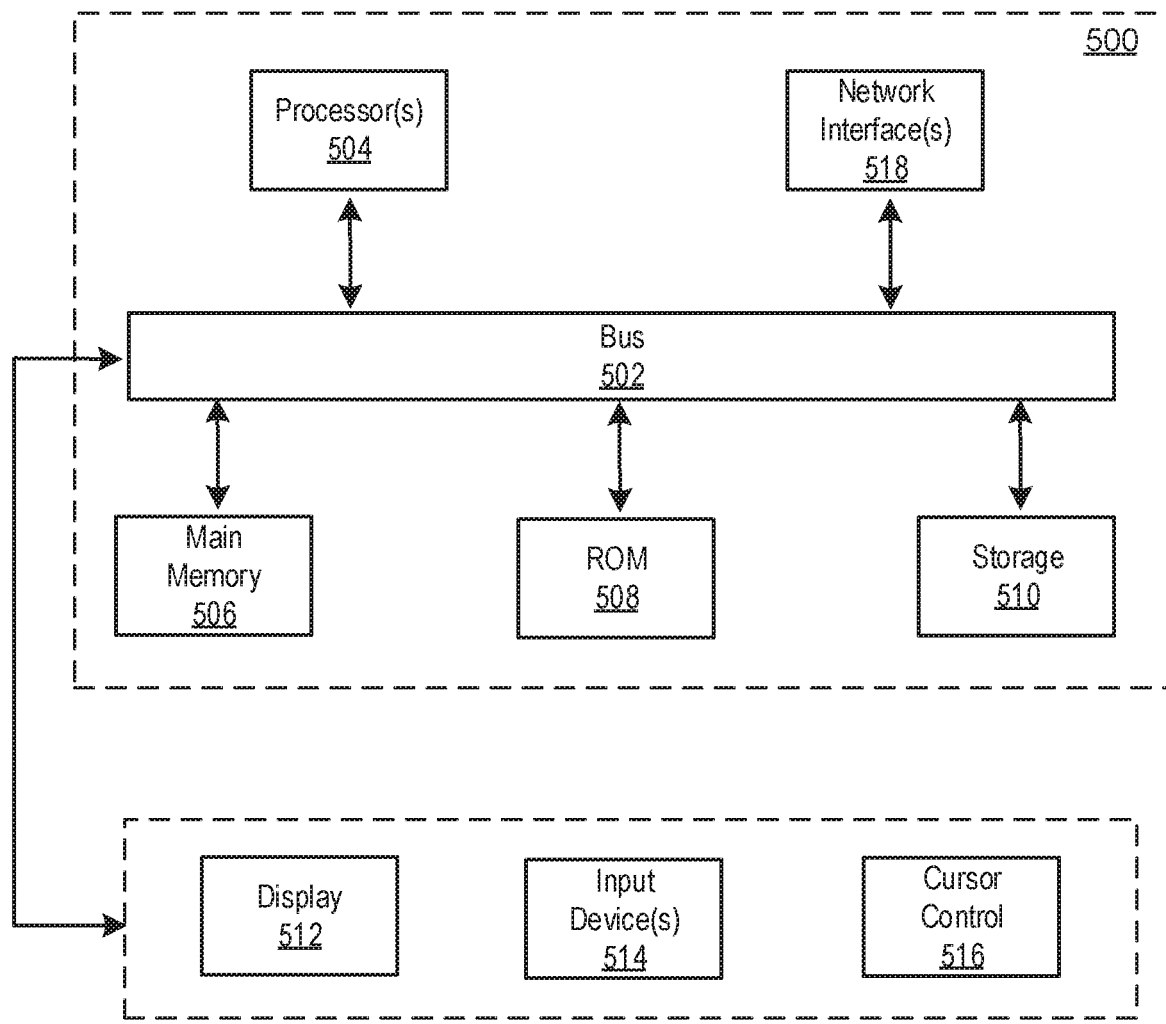
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms.

Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
providing a plurality of threaded category-sensitive chat channels including a first category-sensitive chat channel and a second category-sensitive chat channel, wherein the first category-sensitive chat channel is nested within the second category-sensitive chat channel;
assigning a first category level to the first category-sensitive chat channel and a second category level to the second-category sensitive chat channel, the second category level being higher than the first category level;
obtaining first content to be posted through the first category-sensitive chat channel;
filtering the first content based at least in part on the first category level; and
providing access to the filtered first content in the first category-sensitive chat channel,
wherein the filtered first content is automatically accessible in the second category-sensitive chat channel based at least in part on the first category-sensitive chat channel being nested in the first category-sensitive chat channel and the second category level assigned to the second category-sensitive chat channel being higher than the first category level assigned to the first category-sensitive chat channel.

2. The system of claim 1, wherein filtered first content is assigned the first category level.

3. The system of claim 1, wherein each of the first category level and the second category level is a respective security classification level or a respective sensitivity classification level.

4. The system of claim 1, wherein the first category level and the second category level form at least part of a hierarchy of category levels and filtering the first content based at least in part on the first category level includes filtering out information from the first content that is above the first category level, wherein at least a portion of the information filtered out is at the second category level.

5. The system of claim 1, wherein the instructions further cause the system to perform providing a preview of the filtered first content prior to providing access to the filtered first content in the first category-sensitive chat channel.

6. The system of claim 1, wherein each of the first category-sensitive chat channel and the second category-sensitive chat channel has a respective one or more administrative users and a respective one or more participating users.

7. The system of claim 1, wherein the second category level being higher than the first category level indicates that a greater scope of content is accessible in the second category-sensitive chat channel than in the first category-sensitive chat channel.

8. A method implemented by a computing system including one or more processors and storage media storing machine-readable instructions, wherein the method is performed using the one or more processors, the method comprising:

providing a plurality of threaded category-sensitive chat channels including a first category-sensitive chat channel and a second category-sensitive chat channel, wherein the first category-sensitive chat channel is nested within the second category-sensitive chat channel;

assigning a first category level to the first category-sensitive chat channel and a second category level to the second-category sensitive chat channel, the second category level being higher than the first category level;

obtaining first content to be posted through the first category-sensitive chat channel;

filtering the first content based at least in part on the first category level; and providing access to the filtered first content in the first category-sensitive chat channel, wherein the filtered first content is automatically accessible in the second category-sensitive chat channel based at least in part on the first category-sensitive chat channel being nested in the first category-sensitive chat channel and the second category level assigned to the second category-sensitive chat channel being higher than the first category level assigned to the first category-sensitive chat channel.

9. The method of claim 8, wherein filtered first content is assigned the first category level.

10. The method of claim 8, wherein each of the first category level and the second category level is a respective security classification level or a respective sensitivity classification level.

11. The method of claim 8, wherein the first category level and the second category level form at least part of a hierarchy of category levels and filtering the first content based at least in part on the first category level includes filtering out information from the first content that is above the first category level, wherein at least a portion of the information filtered out is at the second category level.

12. The method of claim 8, further comprising providing a preview of the filtered first content prior to providing access to the filtered first content in the first category-sensitive chat channel.

13. The method of claim 8, wherein each of the first category-sensitive chat channel and the second category-sensitive chat channel has a respective one or more administrative users and a respective one or more participating users.

14. The method of claim 8, further comprising:
obtaining second content to be posted in the second category-sensitive chat channel;
filtering the second content based at least in part on the second category level to obtain second filtered content; and
providing access to the second filtered content in the second category-sensitive chat channel,
wherein each portion of the second filtered content that is at the second category level is not accessible in the first category-sensitive chat channel.

15. A non-transitory computer readable medium comprising instructions that, when executed, cause one or more processors to perform:

providing a plurality of threaded category-sensitive chat channels including a first category-sensitive chat channel and a second category-sensitive chat channel, wherein the first category-sensitive chat channel is nested within the second category-sensitive chat channel;

assigning a first category level to the first category-sensitive chat channel and a second category level to the second-category sensitive chat channel, the second category level being higher than the first category level;

obtaining first content to be posted through the first category-sensitive chat channel;

filtering the first content based at least in part on the first category level; and providing access to the filtered first content in the first category-sensitive chat channel, wherein the filtered first content is automatically accessible in the second category-sensitive chat channel based at least in part on the first category-sensitive chat channel being nested in the first category-sensitive chat channel and the second category level assigned to the second category-sensitive chat channel being higher than the first category level assigned to the first category-sensitive chat channel.

16. The non-transitory computer readable medium of claim 15, wherein filtered first content is assigned the first category level.

17. The non-transitory computer readable medium of claim 15, wherein each of the first category level and the second category level is a respective security classification level or a respective sensitivity classification level.

18. The non-transitory computer readable medium of claim 15, wherein the first category level and the second category level form at least part of a hierarchy of category levels and filtering the first content based at least in part on the first category level includes filtering out information from the first content that is above the first category level, wherein at least a portion of the information filtered out is at the second category level.

19. The non-transitory computer readable medium of claim 15, further comprising providing a preview of the filtered first content prior to providing access to the filtered first content in the first category-sensitive chat channel.

20. The non-transitory computer readable medium of claim 15, wherein filtering the first content comprises:
determining that a first portion and a second portion of the first content should be filtered out based at least in part on the first category level;
redacting the portion of the first content based at least in part on a first one or more characteristics of the first portion of the first content; and
rejecting the second portion of the first content from being made accessible in the first category-sensitive chat channel based at least in part on a second one or more characteristics of the second portion of the first content.

* * * * *